US008286289B2

(12) United States Patent
Ortiz Niembro et al.

(10) Patent No.: US 8,286,289 B2
(45) Date of Patent: Oct. 16, 2012

(54) USE OF ADSORBENTS FOR THE PURIFICATION OF DRY CLEANING SOLVENTS

(75) Inventors: Jose Antonio Ortiz Niembro, Pue (MX); Eric Thomassiny Villaurrutia, Pue (MX); Jorge Bello, Pue (MX); Darren James Litle, Flowery Branch, GA (US)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 12/992,601

(22) PCT Filed: May 14, 2009

(86) PCT No.: PCT/EP2009/003429
§ 371 (c)(1), (2), (4) Date: Mar. 23, 2011

(87) PCT Pub. No.: WO2009/138230
PCT Pub. Date: Nov. 19, 2009

(65) Prior Publication Data
US 2011/0162153 A1    Jul. 7, 2011

(30) Foreign Application Priority Data
May 14, 2008    (EP) .................................... 08008932

(51) Int. Cl.
*D06F 43/08*    (2006.01)
(52) U.S. Cl. ..................................... 8/158; 8/137; 8/142
(58) Field of Classification Search .............. 8/158, 137, 8/142
See application file for complete search history.

(56) References Cited

U.S. PATENT DOCUMENTS

| | | | |
|---|---|---|---|
| 3,658,459 A | 4/1972 | Gartlan | |
| 3,730,347 A | 5/1973 | Giampalmi, Jr. et al. | |
| 4,277,336 A | 7/1981 | Henschel, Jr. | |
| 4,774,004 A | 9/1988 | Gruenewaelder et al. | |
| 7,258,795 B1 | 8/2007 | Nemeth | |
| 7,297,277 B2 * | 11/2007 | Radomyselski et al. | 210/644 |
| 2002/0000009 A1 | 1/2002 | Perry | |
| 2008/0015391 A1 | 1/2008 | Nemeth | |

FOREIGN PATENT DOCUMENTS

| | | |
|---|---|---|
| FR | 2 438 083 A | 4/1980 |
| JP | 09 111653 A | 4/1997 |
| WO | WO 01/34613 A | 5/2001 |
| WO | WO 03/093563 A1 | 11/2003 |

OTHER PUBLICATIONS

International Search Report of PCT/EP2009/003429, Date of Completion Aug. 7, 2009, Date of Mailing Aug. 19, 2009, 3 pages.
Barrett, E.P., et al., The Determination of Pore Volume and Area Distributions in Porous Substances. I. Computations from Nitrogen Isotherms, J. Am. Chem. Soc., vol. 73, 1951, pp. 373-380.

* cited by examiner

*Primary Examiner* — Eisa Elhilo

(57) ABSTRACT

The present invention refers to the use of an adsorbent comprising particles comprising an amorphous phase and a crystalline phase for the purification of dry cleaning solvents. The present invention furthermore relates to a filter unit containing such an adsorbent. It also refers to a dry cleaner containing a filter according to the invention. Additionally, the present invention refers to a process for dry cleaning textiles, wherein an adsorbent according to the invention is used.

13 Claims, 3 Drawing Sheets

USE OF ADSORBENTS FOR THE PURIFICATION OF DRY CLEANING SOLVENTS

The present invention refers to the use of an adsorbent comprising particles comprising an amorphous phase and a crystalline phase for the purification of dry cleaning solvents. The present invention furthermore relates to a filter unit containing such an adsorbent. It also refers to a dry cleaner/dry cleaning machine containing a filter unit according to the invention. Additionally, the present invention refers to a process for dry cleaning textiles, wherein an adsorbent according to the invention is used.

Over the past 75 years, dry cleaning clothes and fabrics has become very important in the commercial and non commercial sector. For this reason, various dry cleaning machines have been developed and are commercially available. Usually, the dry cleaning machines are equipped with a unit for recovery and cleaning the dry cleaning solvent during or after the washing process. The construction design of the machines mainly depends on the dry cleaning solvent and the dry solvent recovery/dry solvent cleaning unit to be used.

Up to now, a variety of solvents, including gasoline and kerosene, have been used in the dry cleaning process. In the early 20th century, carbon tetrachloride was widely used as dry cleaning solvent. However, it became apparent that carbon tetrachloride exposure has severe adverse health effects and tetrachloroethylene and trichloroethylene were found more suitable.

Further improvements were achieved by using perchloroethylene (perc), which is more stable, nonflammable, has excellent cleaning power, and is gentle to most garments. Other solvents which are presently used in the dry cleaning industry are hydrocarbon solvents such as DF-2000 (DF-2000™ is a commercially pure synthethic aliphatic hydrocarbon, Alkanes C11-15-ISO from Exxon Chemical) or EcoSolv (Ecosolv, also known as HC-DCF, is an aliphatic hydrocarbon C10-C13 Isoparaffin from Chevron Phillips). DF-2000 is a synthetic aliphatic hydrocarbon having a flash point of 65° C., which allows safe handling of the solvent. Perc has a flash point of 45° C.

In order to remove stains from a variety of fabrics, the dry cleaning process mostly requires the use of detergents and sometimes a small amount of water. The detergents help dissolve hydrophilic soils and keep soil from redepositing on the garments. Depending on the machine's design, either an anionic or cationic detergent is used. An average dry cleaner uses about 230-270 liter of fluid. The machines agitate clothes in a manner similar to a standard water washing machine to remove dirt, oil, and stains. After the washing process, the dry cleaning solvent has to be purified for reuse.

The dry cleaning solvents can for example be purified by using distillation processes. Approximately 95% of the dry cleaning machines in the US are equipped with a still unit and a chiller to purify the dry cleaning solvent after certain amounts of clothes have been cleaned. However, the distillation process is expensive and a potential risk of accidents exists when operating machines with solvents at high temperatures. Another disadvantage resulting from the purification of low boiling dry cleaning solvents by distillation is the bacterial contamination. In hydrocarbon and silicone solvents, distillation neither prevents nor reduces bacterial contamination of the solvent. Therefore, dry cleaning machines with still units often use additional processes to further improve the quality of the dry cleaning solvent.

In addition to the still unit, many dry cleaning machines comprise separated "cartridge filters" or "carbon tower filters" filled with activated carbon which can optionally be used to purify the dry cleaning solvent when a bleeding of colored clothes is detected. FIG. 1 shows a simplified diagram of a dry cleaning process using perc as the dry cleaning solvent. Purification of the dry cleaning solvent is carried out using a still unit in combination with a carbon adsorbent and a filter for non-soluble particles.

In some dry cleaning machines, the still unit is substituted by filter units containing adsorbents. In a typical dry cleaning process, the used dry cleaning solvent is removed from the washing chamber and passes through several filtration steps before it is returned to the washing chamber. The first step can be a vessel trap which prevents small objects such as lint, fasteners, buttons, and coins from entering the solvent pump.

After this, the solvent passes through a filter which removes lint and insoluble suspended soils from the dry cleaning solvent. Many machines use "spin disc filters" in which the cake is removed from the filter surface by centrifugal action while the filter is backwashed with dry cleaning solvent.

After the lint filter, the solvent passes through an absorptive cartridge filter. This filter is made from activated clays and charcoal and removes fine insoluble soil and non-volatile residues, along with dyes from the dry cleaning solvent.

Finally, the solvent passes through a polishing filter which removes any soil not previously removed. The clean solvent is then returned to the working solvent tank.

Filter cartridges are described in U.S. Pat. No. 3,730,347, wherein filtration is accomplished with a cloth or paper filter element while dissolved substances are usually removed by passing the contaminated solvent through a bed of a granular adsorbent such as activated charcoal. Conventionally, the two elements are combined in a solvent filtering and conditioning cartridge whereby the solvent first passes through an outer tubular accordionplaited filter paper unit, then flows through a concentric tubular bed of activated charcoal and into a perforated central outlet tube. The solvent can be a halogenated aliphatic hydrocarbon such as perchloroethylene or 1,1,2-trichloro-1,2,2-trifluoroethane or a hydrocarbon of the Stoddard solvent type.

Disc filtration is an alternative to the use of cartridge filters. It can also be used in combination with cartridge filters. The spin disc system is composed of a hard screen in the form of a tubular canister. Inside the canister, several discs with fabric (generally nylon) filter are lined up in a row. The contaminated solvent passes through the discs which can contain a filter medium like carbon or diatomaceous earth.

In some processes, the dry cleaning solvent passes through a mass or bed of activated carbon which adsorbs the contaminants. There are, however, several major disadvantages resulting from the use of activated carbon as adsorbent for removing dissolved contaminants from dry cleaning solvents. Firstly, activated carbon tends to absorb the dry cleaning solvent, detergents and other aids added to the dry cleaning solvents. And, when the activated carbon becomes moistened with traces of water, it tends to clog the filters, thus, preventing filtration of the solvent during the dry cleaning process.

U.S. Pat. Nos. 4,277,336 and 3,658,459 disclose filters containing carbon and clay adsorbent materials. The lifetime of such filters is limited by the capacity of the clay adsorbent in the filter. The clay adsorbent has a finite capacity for absorbing contaminants, and once that capacity is met, the filter must be replaced with a new filter.

WO 03/093563 refers to a filtration device for removing contaminants from used solvents, wherein the filtration device is operatively connected to the reservoir and/or the vessel, wherein the fabric article come in contact with the dry cleaning solvent. The adsorbent materials to be used in the filtration device are activated carbons which can be combined with additional adsorbent materials selected from the group consisting of a polar agent, a non polar agent, a charged agent, and mixtures thereof.

U.S. Pat. No. 3,658,459 discloses the use of attapulgite, packed in a solvent-permeable container. The container can e.g. be a bag made from cellulosic or synthetic fibrous material or can be a fine mesh metallic container. The container can be equipped with suitable means to handle the bag, like for example an attached draw cord for removal of the bag out of the solvent cleaning tank. During the dry cleaning process, the solvent dissolves the soluble components such as grease, stains, wax, fats, oils and the like from the soiled garments and fabrics. The contaminated solvent passes through the solvent-permeable bag and comes in contact with the attapulgite which removes the contaminants.

The dry cleaning machines which were used with respect to the present invention can be obtained from the company Kelleher, USA (compare experimental part). Kellehers's hydrocarbon machines are equipped with a filter unit containing adsorbents for recovery and purification of the dry cleaning solvents. As dry cleaning solvent, e.g. DF 2000 or perc can be used. The dry cleaning machines are designed for the use of e.g. the commercially available Tonsil® adsorbents, e.g. "Tonsil® 414 FF", obtainable from Sued-Chemie AG, Germany. Tonsil® 414 FF filter powder is produced by using bentonite as the starting material. Tonsil® 414 FF possesses very good properties with respect to the adsorption of non-volatile residues, lint, dyes, grease, soils, soaps and traces of detergents. For use in the dry cleaning process, Tonsil® 414 FF is mixed with 50 wt.-% diatomaceous earth (also known as DE). Diatomaceous earth consists of 86% silica, 5% sodium, 3% magnesium and 2% iron.

The precoating of the nylon spin disc filter with adsorbents before the washing process is described in example 2.

The use of diatomaceous earth is necessary to improve the filtration throughput through the nylon spin disc filters. However, as diatomaceous earth represents an inert material, the cleaning capacity per kilogram blend is lower than when using pure adsorbent.

Furthermore, it is not possible to use Tonsil® 414 FF in cartridge filters, as the fine material leads to the clogging of the filter. Accordingly, there is a need for an adsorbent which possesses the same or even improved cleaning properties, e.g. cleaning capacity, compared to Tonsil® 414 FF, but does not have the aforementioned drawbacks. Such an adsorbent should preferably be suitable for the application in pure form when using spin disc filters.

As mentioned above, some commercially available dry cleaning machines have a separate small side filter called "carbon tower" or "deco" filter (abbreviation for decolorizing). These filters are usually filled with pellets of carbon and can e.g. be obtained from Kleen-Rite, USA. However, those filters are not as effective as Tonsil® with respect to the elimination of dyes. Furthermore, the carbon pellets are saturated rather quickly and must be replaced very often. For example Kleen-Rite recommends the changing of the carbon cartridge every 2000 pounds of clothes, depending on the degree of impurities in the fiber cloths. Thus, it would be of advantage to substitute the carbon pellets of those separate filters with a more effective adsorbent. However, filter cartridges can only be filled with granular material due to the pore size of the filter cartridge. Therefore, the Tonsil® adsorbents in powder form are not particularly suitable as they would not be kept well in the filter cartridge.

It is therefore an objective of the present invention to provide adsorbents having improved properties, such as an improved cleaning capacity and enhanced filtration properties, for the purification of dry cleaning solvents. It is a further objective to provide filter units for the purification of dry cleaning solvents without additional still units being necessary. Due to the easy handling, cartridge filters are the especially preferred filter system.

The objectives underlying a first aspect of the present invention have been solved by the subject matter as defined in the claims.

The well known adsorbent Tonsil® 414 FF represents a layered silicate which does not have suitable filtration properties in pure form in order to be used with nylon disc filters. It has been unexpectedly found that adsorbents comprising particles comprising an amorphous phase and a crystalline phase have very good filtration properties and can directly be used in pure form with spin disc filters without an addition of DE being necessary (see example 2 below).

In the known dry cleaning processes, Tonsil® 414 FF is usually used in 1-3 pound increments (with equal parts DE) with nylon disc filters. This amount of Tonsil® 414 FF (with corresponding DE) is suitable for cleaning 350-500 pounds of clothes. It has been found that the adsorbents to be used according to the present invention have a higher cleaning capacity and do not have to be replaced as often as the Tonsil® adsorbents. In addition, less waste is produced in the washing process as the adsorbent according to the invention provides a higher performance. FIG. 2 shows a simplified diagram for dry cleaning using perc as the dry cleaning solvent and nylon spin disc filters. When using Tonsil® adsorbents, it is not necessary to distill the dry cleaning solvent.

It has been found that the granular adsorbents to be used according to the invention have a very high cleaning capacity when purifying dry cleaning solvent. For example, two split cartridges (containing 10-15 pounds of granular adsorbent) can filter the dry cleaning solvent from approximately 4000-5000 pounds of processed clothes which has been used on all types of colored clothes. Filter cartridges are of advantage as they can be replaced more easily than spin disc filters. FIG. 3 depicts a simplified diagram for a dry cleaning process wherein the dry cleaning solvent is purified using a granular adsorbent and a filter for non-soluble particles.

It has furthermore unexpectedly been found that filter cartridges filled with granular adsorbents according to the invention remove dyes form dry cleaning solvents faster than a distillation process can do. Compared to dry cleaning processes with a distillation step, the filters and cartridges according to the invention furthermore reduce the amount of energy required for the process.

Furthermore, it was found that the use of adsorbents comprising particles comprising an amorphous phase and a crystalline phase allows to decrease the bacterial contamination of dry cleaning solvents.

The present invention refers to the use of an adsorbent comprising particles comprising an amorphous phase and a crystalline phase for the purification of dry cleaning solvents.

The expression "dry cleaning solvent", as used herein, refers to any solvents suitable for the use in a dry cleaning process. Preferably, the dry cleaning solvents to be used in terms of the present invention are hydrocarbon solvents, halogenated (chlorinated or fluorinated) hydrocarbons solvents, silicone solvents or mixtures thereof. Silicone solvents are polysiloxanes and can for example be dialkylsiloxanes, alkylarylsiloxanes, diarylsiloxanes, alkoxylated polydimethylsiloxanes, or fluoroalkylsiloxanes. A preferred silicone solvent is decamethylcyclopentasiloxane. Further preferred, the dry cleaning solvents to be purified according to the invention are synthetic aliphatic hydrocarbons, perchlorinated hydrocarbons, silicone solvents or mixtures thereof. Further preferred, the dry cleaning solvents are selected from the group consisting of perchloroethylene (perc), hydrocarbons, silicones, and mixtures thereof. Even further preferred, the dry cleaning solvents are selected from the group consisting of perc, decamethylcyclopentasiloxane, synthethic aliphatic hydrocarbons, in particular alkanes C11-15-ISO or C10-C13 isoparaffin, and mixtures thereof. The most preferred cleaning solvent is perc. It is furthermore more preferred that the above defined dry cleaning solvents do not contain fatty acid methyl esters.

The particles comprised in the adsorbent to be used according to the invention do not have a well ordered structure as found in common clay minerals like bentonite or attapulgite but comprise besides a crystalline phase, which is preferably a smectite clay phase, an amorphous phase, which is preferably an amorphous silica phase. The particles are preferably homogenous on a macroscopic scale, i.e. they can be described as an intimate mixture of both phases.

The amorphous phase of the particles comprised in the adsorbent to be used for the purification of dry cleaning solvents according to the invention preferably represents an amorphous silica phase. The amorphous phase of the particles can be analyzed by the signal-to-noise ratio when using X-ray-diffraction analysis as described below.

The crystalline phase of the particles comprised in the adsorbent to be used for the purification of dry cleaning solvents according to the invention preferably represents a layered silicate. It is further preferred that the crystalline phase of the particles represents a smectite phase, preferably a montmorillonite phase. The presence of a smectite phase can be detected by the methylene blue adsorption test described further below. Generally, the crystalline phase can be detected using X-ray-diffraction analysis.

In a preferred embodiment of the invention, the particles to be used for the adsorbent comprise a continuous phase of amorphous silica into which small platelet-shaped smectite phases are inserted. The platelets of the smectite phase are preferably homogeneously distributed in the continuous amorphous silica phase and firmly fixed therein. The structure of the particles therefore differs from clay minerals which are presently used for the purification of dry cleaning solvents. Even further preferred, the particles to be used for the purification of dry cleaning solvents according to the invention comprise a matrix-like network of amorphous $SiO_2$ into which very small smectite phases are inserted and which can surprisingly provide a high adsorption capacity for impurities contained in dry cleaning solvent.

The adsorbents to be used for the purification of dry cleaning solvents according to the present invention are preferably in the form of powders, agglomerates or granules, further preferred in the form of agglomerates or granules. Adsorbents in the form of agglomerates or granules can advantageously be used in cartridge filters.

It is additionally preferred that the adsorbents contain particles in powder form having a particle size between 1 and 1000 µm, preferably between 1 and 700 µm, and most preferably between 1 and 500 µm. It is additionally preferred that the adsorbents contain particles in the form of agglomerates or granules having a particle size between 0.01 and 10 mm, further preferred between 0.05 and 4.0 mm. In a preferred embodiment, the particle size of the granular material is between 0.05 and 1.4 mm. In another preferred embodiment, the particles size of the granular material is between 0.2 and 1.6 mm. In a further preferred embodiment of the invention, the particles size of the granular material is between 1.2 and 4.0 mm. It is understood that with respect to the preferred particles sizes as given above, at least 80%, further preferred at least 90%, further preferred at least 95% and most preferred at least 98% of the particles comprising an amorphous phase and a crystalline phase have the specified size.

According to the invention, the adsorbents for purifying dry cleaning solvents are preferably used in a suspended state or in an immobilized state. Preferably, the purification of the dry cleaning solvents comprises removing of impurities selected from the group consisting of non-volatile residues, lint, dyes, grease, soils, soaps, and traces of detergents.

The adsorbents to be used for the purification of dry cleaning solvents may be synthetic materials or materials provided from a natural source, preferably, a material provided from a natural source. Such materials can be provided very easily, environmental friendly and at comparatively low cost, e.g. from a respective mine. Adsorbents/particles which fulfill the requirements as described herein and are suitable for the purification of dry cleaning solvents according to the present invention can easily be found and identified by a skilled person. Suitable materials which can be used as particles (comprised in the adsorbents) can for example be obtained from the company Sued-Chemie (see experimental part).

Additionally preferred, the particles comprised in the adsorbent possess a surface area of 180 to 300 $m^2/g$, more preferred 185 to 280 $m^2/g$, further preferred of 190 to 250 $m^2/g$ as determined by the BET method. Additionally preferred, the particles possess a pore volume of more than 0.5 ml/g, particularly preferred of more than 0.55 ml/g, most preferred of more than 0.6 ml/g. In addition, the pore volume of the particles is less than 1.2 ml/g, further preferred less than 1.0 ml/g and even further preferred less than 0.9 ml/g.

The large pore volume is believed to allow a rapid access of the contaminated dry cleaning solvent to the crystalline phases, e.g. the smectite phases and, therefore, an efficient purification is achieved. It is believed, without being bound to this theoretical mechanism, that the advantageous behaviour of the adsorbent used in the method according to the invention is based on kinetic effects. In the clay minerals hitherto used as adsorbent material only the outer surface of the clay particles is available for a fast adsorption of molecules. Such outer surface is much smaller than the inner surface of clay minerals as e.g. determined by BET-methods. During adsorption, the molecules, e.g. dyes, are intercalated between layers in the crystal structure of the clay mineral and the interlayer distance is increased. The clay mineral therefore swells upon adsorption of molecules. The swelling starts at the outer surface of the clay particles thereby blocking or at least rendering difficult the access of further molecules to be adsorbed to the inner parts of the clay particles.

Contrary to the hitherto used clay minerals the particles as used in the method according to the invention preferably comprise a matrix of amorphous $SiO_2$ into which are inserted small particles of smectite minerals. The smectite particles are preferably delaminated to a high degree and therefore provide a very high surface area for adsorption of molecules, e.g. dyes etc. The $SiO_2$-matrix is believed to be quite rigid, i.e. the particles do hardly swell upon adsorption of e.g. dyes. Through the large pores provided in the particles, which are in particular situated in the $SiO_2$-matrix, a rapid access of the contaminated dry cleaning solvent to the crystalline phases inserted in the $SiO_2$-matrix is possible throughout the purification process since the particles do hardly swell during adsorption of compounds present in the contaminated dry cleaning solvent. This leads to an enhanced adsorption speed in comparison to the application of the hitherto used clay minerals.

Additionally preferred, the particles comprised in the adsorbent used in the method according to the invention comprise at least 10 wt.-%, further preferred more than 20 wt.-% and most preferred more than 30 wt.-% of an amorphous phase. According to an embodiment of the invention, the amorphous phase forms less than 90 wt.-%, according to a further embodiment less than 80 wt.-% of the particles. The amorphous phase is preferably formed from $SiO_2$. Besides the amorphous phase, the particles used in the method of the invention preferably comprise a smectite phase. The particles preferably comprise less than 60 wt.-%, more preferred less than 50%, further preferred less than 40 wt.-% of a smectite phase. According to an embodiment of the invention, the smectite phase forms at least 10 wt.-%, according to a further embodiment at least 20 wt.-% of the particles. The ratio smectite phase/amorphous phase preferably is within a range of 2 to 0.5, more preferred within 1.2 to 0.8.

Besides the amorphous phase and the crystalline phase, further minerals may be present in the particles comprised in the adsorbent, preferably within a range of from 0.5 to 40 wt.-%, more preferred of from 1 to 30 wt.-%, particularly preferred of from 3 to 20 wt.-%. Exemplary side minerals are quartz, cristobalite, feldspar and calcite. Other side minerals may also be present. The aforementioned additional minerals can also be present in the adsorbent without being necessarily contained in the particles having an amorphous phase and a crystalline phase.

It is additionally preferred that the adsorbent to be used according to the present invention comprises at least 50 wt.-%, further preferred at least 60 wt.-%, further preferred at least 70 wt.-%, further preferred at least 80 wt.-%, further preferred at least 90 wt.-%, even further preferred at least 95 wt.-%, of particles comprising an amorphous phase and a crystalline phase. In the most preferred embodiment of the invention, the adsorbent consists only of particles comprising an amorphous phase and a crystalline phase as described above.

The structure of the above described adsorbents and particles comprised in the adsorbents can be detected by various experimental methods (see experimental part).

As explained above, the preferred particles to be used in the method according to the invention have an amorphous silica phase into which crystalline phases, e.g. small smectite phases, are inserted. The matrix preferably formed from amorphous silica "dilutes" the crystalline phases, e.g. the smectite phases. This leads to a lowering of the signal-to-noise ratio of typical reflections of the crystalline phase, e.g. the smectite phase, depending on the fraction of the crystalline phase. E.g. the small angle reflections of montmorillonite are effected by the periodic distance between layers of the montmorillonite structure.

Furthermore, if the crystalline phases fixed in the $SiO_2$-matrix are delaminated to a very high degree this leads to a strong broadening of the corresponding diffraction peak.

In an XRD-diffractogram of the particles comprised in the adsorbent used in the method of the invention, the reflexes are hardly visible above noise. The ratio signal noise for reflexes regarding the particles, in particular the smectite phase, is preferably close to 1, further preferred within a range of from 1 to 1.2. However, sharp reflexes may be visible in the diffractogram originating from impurities of the particles, e.g. quartz. Such reflexes are not considered for determination of the signal/noise ratio.

Preferably, particles are used in the method of the invention, which do not or do hardly show a 001 reflection indicating the layer distance within the crystal structure of bentonite particles. Hardly visible means that the signal-to-noise ratio of the 001 reflection of the smectite phase is preferably less than 1.2, particularly preferred is within a range of 1.0 to 1.1.

According to a preferred embodiment, the particles comprised in the adsorbent have an amorphous structure according to XRD data. The amount of amorphous silica phase and crystalline phase, e.g. smectite phase, present in the particles used in the method according to the invention may be determined by quantitative X-ray-diffraction analysis. Details of such method are described e.g. in "Hand Book of Clay Science", F. Bergaya, B. K. G. Therry, G. Lagaly (Eds.), Elsevier, Oxford, Amsterdam, 2006, Chapter 12.1: I. Srodon, Identification and Quantitative Analysis of Clay Minerals; "X-Ray Diffraction and the Identification and Analysis of Clay Minerals", D. M. Moora and R. C. Reaynolds, Oxford University Press, New York, 1997, pp 765, included herein by reference.

Quantitative X-ray diffraction is based on the Rietveld refinement formalism. This algorithm was originally developed by H. M. Rietveld for the refinement of crystal structures. The method is now commonly used in mineralogy and e.g. the cement industry for quantification of mineral phases in unknown samples.

The Rietveld refinement algorithm is based on a calculated fit of a simulated diffraction pattern on a measured diffractogram. First, the mineral phases are determined by assigning peaks of the diffractogram. Based on the minerals determined, the diffractogram is then calculated based on the crystal structure of the minerals present in the sample as well as on equipment and sample specific parameters. In the next steps, the parameters of the model are adjusted to get a good fit of the calculated and the measured diffractogram, e.g. by using the least square-fit method. Details of the method are e.g. described in R. A. Young: "The Rietveld Method", Oxford University Press, 1995. The Rietveld method is able to deal reliably with strongly overlapping reflections in the diffractogram.

For application of this method to the analysis of mineral samples, see e.g. D. K. McCarthy "Quantitative Mineral Analysis of Clay-bearing Mixtures", in: "The Reynolds Cup" Contest. IUCr CPD Newsletter, 27, 2002, 12-16.

In practice, the quantitative determination of the different minerals in unknown samples is done by commercially available software, e.g. "Seifert AutoQuan" available from Seifert/GE Inspection Technologies, Ahrensburg, Germany.

The particles comprised in the adsorbent, in particular when mined from a natural source, preferably have a cation exchange capacity of more than 40 meq/100 g, particularly preferred of more than 45 meq/100 g and most preferred of from 44 to 70 meq/100 g. High activity bleaching earth obtained by extracting a clay mineral with boiling strong acid is characterized by a very low cation exchange capacity of usually less than 40 meq/100 g and in most cases of less than 30 meq/100 g. The particles used in the method according to the invention therefore can clearly be distinguished from such high performance bleaching earth.

So-called surface modified bleaching earths exhibit a similar cation exchange capacity as the particles used in the method according to the invention. Such surface activated bleaching earths, however, have a much lower pore volume and, therefore, can clearly be distinguished from the particles used in the method of the invention. Such surface modified bleaching earth do not allow an easy access of the contaminated dry cleaning solvents to the inner parts of the clay particle since those clay materials swell as described above and therefore block a further access of the contaminated dry cleaning solvents to the interlayer spaces of the layered silicate. The adsorption speed of such surface activated bleaching earth therefore is low.

The particles used in the method according to the invention are characterized by a high content of $SiO_2$. Besides silicon, other preferred metals or metal oxides may be contained in the particles or adsorbent. All percentages refer to particles dried to constant weight at 105° C.

The particles preferably have a low aluminum content of, calculated as $Al_2O_3$, less than 15 wt.-%, more preferred of less than 12 wt.-%, particularly preferred of less than 11 wt.-% and most preferred of less than 10 wt.-%. The aluminum content, calculated as $Al_2O_3$, according to an embodiment is more than 2 wt.-%, according to a further embodiment more than 4 wt.-%, according to a further embodiment is more than 6 wt.-% and according to a still further embodiment is more than 8 wt.-%. According to a further embodiment, the particles contain magnesium, calculated as MgO, in an amount of less than 7 wt.-%, preferably of less than 6 wt.-%, particularly preferred less than 5 wt.-%. According to an embodiment of the invention, the particles contain magnesium, calculated as MgO, in an amount of at least 0.5 wt.-%, particularly preferred at least 1.0 wt.-%. According to a further embodiment, the particles contain at least 2 wt.-% MgO.

According to a preferred embodiment, the particles may contain iron, calculated as $Fe_2O_3$, in amount of less than 8 wt.-%. According to a further embodiment, the iron content, calculated as $Fe_2O_3$, may be less than 6 wt.-% and according to a still further embodiment may be less than 5 wt.-%. According to a further embodiment, the particles may contain iron, calculated as $Fe_2O_3$, in an amount of at least 1 wt.-%, and according to a still further embodiment in an amount of at least 2 wt.-%.

The inventors believe that the distribution of the pore diameter of the particles has a considerable effect on the activity of the adsorbent. In a first embodiment of the method of the invention, to obtain a high adsorption activity, it is preferred that particles are used which are characterized in that at least 60%, preferably 65 to 70% of the total pore volume of the particles is provided by pores having a pore diameter of at least 140 Å, at least 40%, preferably at least 50%, particularly preferred 55 to 60% of the total pore volume is provided by pores having a pore diameter of less than 250 Å, and at least 15%, more preferred at least 20%, particularly preferred 21 to 25% of the total pore volume is provided by pores having a pore diameter of 140 to 250 Å. Preferably less than 20% of the total pore volume, particularly preferred less than 15%, most preferred 10 to 14% of the total pore volume is formed by pores having a diameter of >800 Å.

Additionally preferred, at least 20%, preferably at least 25%, particularly preferred at least 30% and most preferred 33 to 40% of the total pore volume of the particles is provided by pores having a pore diameter of less than 140 Å.

Additionally preferred, at least 10%, preferably at least 13%, particularly preferred 15 to 20% of the total pore volume of the particles according to the first embodiment of the method according to the invention is provided by pores having a pore diameter of 75 to 140 Å.

Still further preferred, less than 40%, preferably less than 35%, particularly preferred 25 to 33% of the total pore volume of the particles is formed by pores having a pore diameter of 250 to 800 Å.

Additionally preferred, less than 80%, more preferred less than 75%, particularly preferred 60 to 70% of the total pore volume of the particles is formed by pores having a pore diameter of more than 140 Å.

Additionally preferred, less than 60%, preferably less than 50%, particularly preferred 40 to 45% of the total pore volume of the particles is formed by pores having a pore diameter of at least 250 Å.

Preferred ranges of the total pore volume in relation to the pore diameter are summarized in the following table 1:

TABLE 1 preferred percentages of the total pore volume formed by pores of a distinct pore diameter for particles used in a first embodiment of the purification method according to the invention.

| pore diameter | preferred | particularly preferred | most preferred |
|---|---|---|---|
| 0-75 Å | >12% | >14% | 15-20% |
| 75-140 Å | >10% | >13% | 15-20% |
| 140-250 Å | >15% | >20% | 21-25% |
| 250-800 Å | <40% | <35% | 25-33% |
| >800 Å | <20% | <15% | 10-14% |

According to a second embodiment particles are used in the method according to the invention in which preferably at least 20%, preferably at least 22% of the pore volume, particularly preferred 20 to 30% of the total pore volume is formed by pores having a pore diameter of less than 75 Å.

Additionally preferred, at least 45%, particularly preferred at least 50% of the total pore volume of the particles used according to the second embodiment of the method according to the invention is provided by pores having a pore diameter of less than 140 Å.

Furthermore, preferably less than 40%, particularly preferred less than 35% of the total pore volume is formed by pores having a pore diameter of more than 250 Å. The particles used in the second embodiment of the method according to the invention comprises only a low amount of large pores. Nevertheless an efficient purification of dry cleaning solvents is possible within a time frame acceptable for an industrial application. In table 2 the preferred share of the pore volume provided by pores having a defined pore diameter is summarized.

TABLE 2 preferred percentages of the total pore volume formed by pores of a distinct pore diameter for particles used in a second embodiment of the purification method according to the invention

| pore diameter | preferred percentage | particularly preferred percentage |
|---|---|---|
| 0-250 Å | >55% | 60-80% |
| 0-800 Å | <90% | 70-85% |
| >800 Å | <30% | 10-25% |
| 75-140 Å | <40% | 20-35% |
| 140-250 Å | <25% | 10-20% |
| 250-800 Å | <20% | 5-20% |
| 75-800 Å | <65% | 50-60% |
| >75 Å | <85% | 60-80% |
| >140 Å | <60% | 30-50% |
| >250 Å | <40% | 25-35% |

The adsorbent used in the method of the invention preferably reacts neutral to slightly alkaline. A 10 wt.-% suspension of the adsorbent in water preferably has a pH in the range of 5.5 to 9.0, particularly preferred 5.9 to 8.7, most preferred 7.0 to 8.5. The pH is determined with a pH-electrode according to DIN ISO 7879.

According to a preferred embodiment, the adsorbents/particles to be used according to the invention do not have to be activated, in particular by acid treatment.

Preferably, the granular adsorbent is used in dry cleaning machines with cartridge filtration (large format cartridges or fixed nylon disc filters accompanied by a small format cartridge) and optionally (mostly not necessary) a distillation unit. The granular product can filter hydrocarbons, perc, or silicones.

The present invention also relates to a filter unit containing an adsorbent comprising particles comprising an amorphous phase and a crystalline phase as defined above. Preferably, the filter contains the adsorbent in a suspended state or in an immobilized state. Most preferably, the filter represents a cartridge filter which comprises the adsorbent in an immobilized state.

In a preferred embodiment, the filter unit is a filter cartridge containing the adsorbent in dry state before use. Further preferred, the filter cartridge is a tower or paper filter. Preferably, the paper filters are disposable products, which can be replaced after use. Preferably, the filter has a porous paper wall or a perforated steel wall to avoid fine particles leaching out of the cartridge.

The present invention furthermore refers to a dry cleaner containing a filter unit as defined above.

The present invention furthermore refers to a process for dry cleaning textiles, wherein the textiles are washed using at least one dry cleaning solvent, and wherein the dry cleaning solvent/s is/are purified using at least an adsorbent comprising particles comprising an amorphous phase and a crystalline phase. All the preferred adsorbents/particles as described above can preferably be used in the process for dry cleaning textiles according to the invention. If the adsorbent is used in powder form, it is preferably suspended in the dry cleaning solvent/s during purification of the dry cleaning solvent/s, and the adsorbent is separated from the dry cleaning solvent/s using a filter, in particular a nylon disc filter. If the adsorbent is used as granulates or agglomerates, it is preferred to use a filter cartridge containing the adsorbent. Preferably, the dry cleaning solvent/s is/are purified using a filter unit according to the invention.

METHODS

Figure 1:
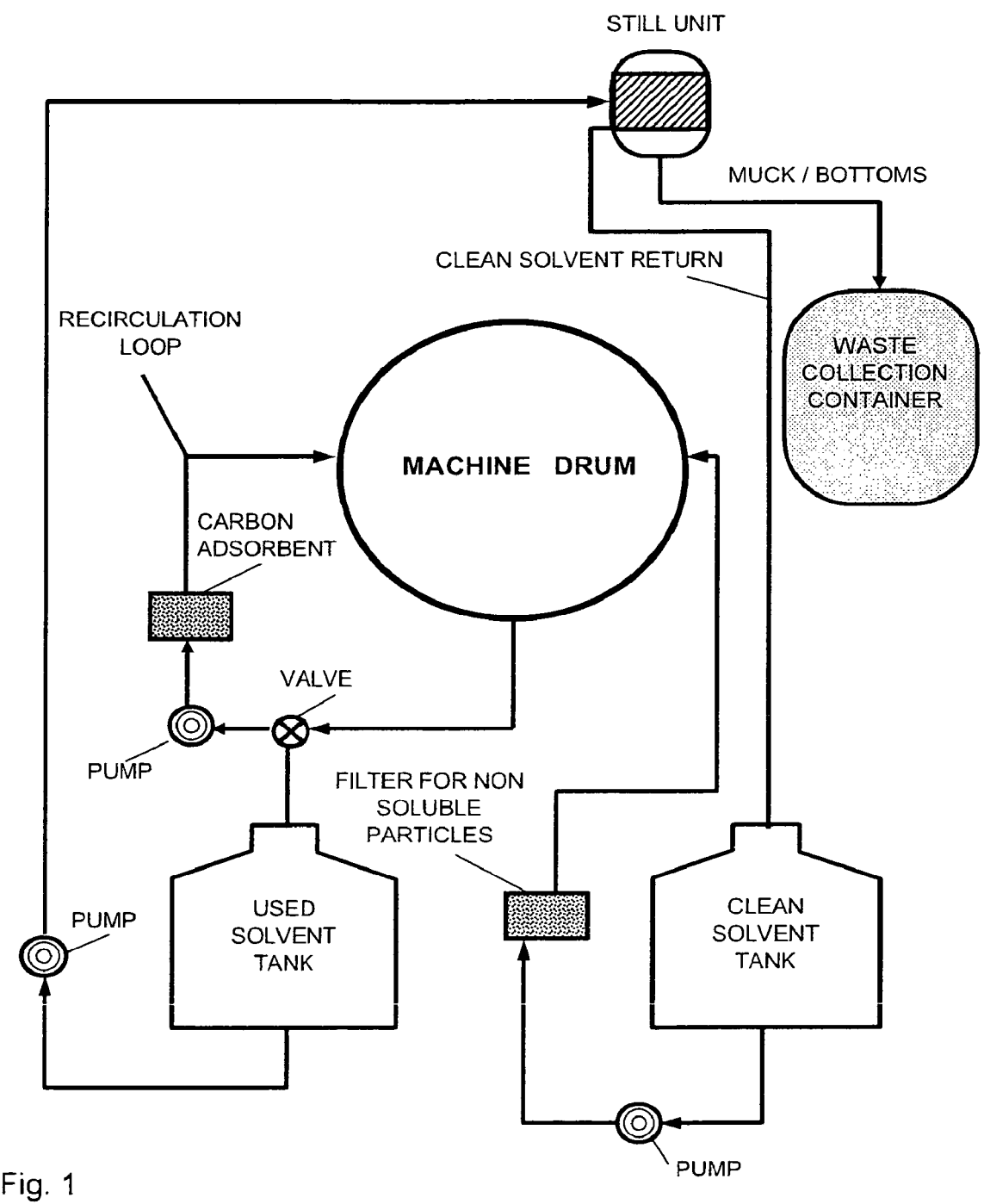
FIG. 1 shows a simplified diagram for a dry cleaning process using perc as the dry cleaning solvent and an integral carbon cartridge for filtering.
Figure 2:
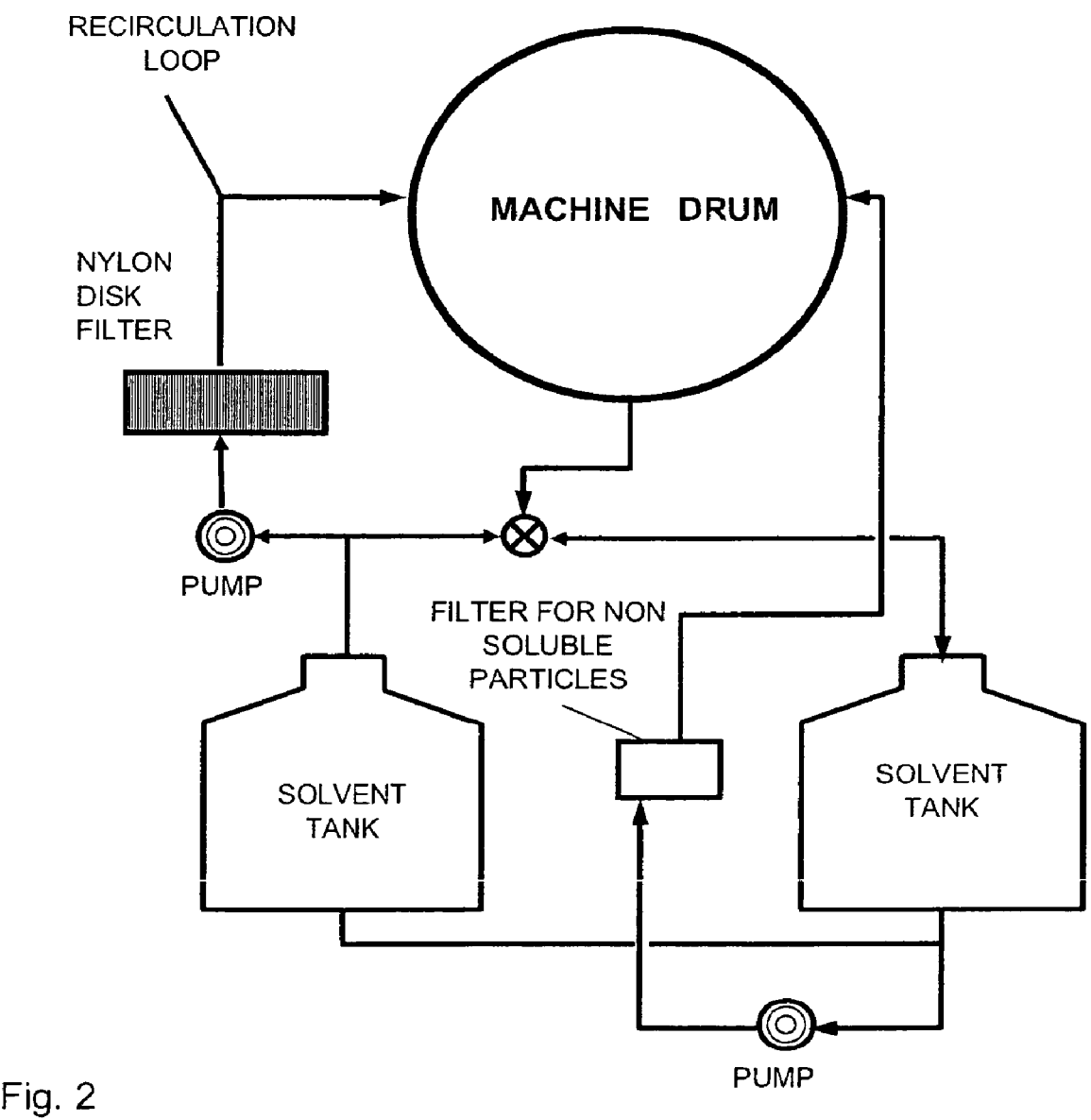
FIG. 2 shows a simplified diagram for a dry cleaning process using perc as the dry cleaning solvent and a nylon disc filter for filtering.
Figure 3:
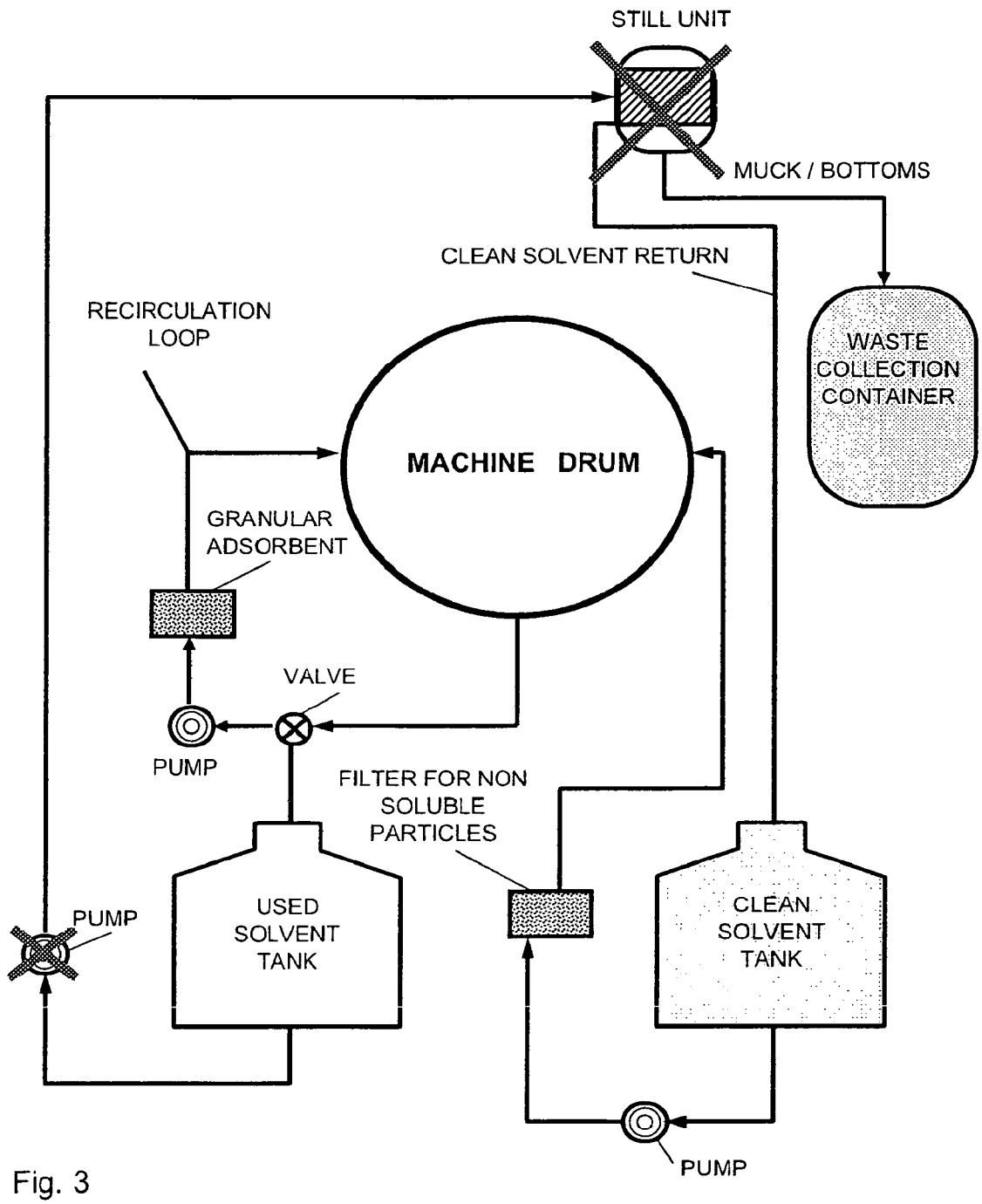
FIG. 3 shows a simplified diagram for a dry cleaning process using perc as the dry cleaning solvent and an integral granular adsorbent for filtering. It is not necessary to carry out a distillation of the dry cleaning solvent in this process.

The physical features used to characterize the particles/adsorbents used in the method according to the invention are determined as follows:

Specific Surface and Pore Volume

Specific surface and pore volume is determined by the BET-method (single-point method using nitrogen, according to DIN 66131) with an automatic nitrogen-porosimeter of Micrometrics, type ASAP 2010. The pore volume was determined using the BJH-method (E. P. Barrett, L. G. Joyner, P. P. Hienda, J. Am. Chem. Soc. 73 (1951) 373). Pore volumes of defined ranges of pore diameter were measured by summing up incremental pore volumina, which were determined from the adsorption isotherm according BJH. The total pore volume refers to pores having a diameter of 2 to 350 nm. The measurements provide as additional parameters the micropore surface, the external surface and the micropore volume. Micropores refer to pores having a pore diameter of up to 2 nm according to Pure & Applied Chem. Vol. 51, 603-619 (1985).

Humidity

The amount of water present in the adsorbent/particles at a temperature of 105° C. was determined according to DIN/ISO-787/2.

Silicate Analysis

The adsorbent/particles was/were totally disintegrated. After dissolution of the solids the compounds were analysed and quantified by specific methods, e.g. ICP.

a) Sample Disintegration

A 10 g sample of the adsorbent/particles is comminuted to obtain a fine powder which is dried in an oven at 105° C. until constant weight. About 1.4 g of the dried sample is deposited in a platinum bowl and the weight is determined with a precision of 0.001 g. Then the sample is mixed with a 4 to 6-fold excess (weight) of a mixture of sodium carbonate and potassium carbonate (1:1). The mixture is placed in the platinum bowl into a Simon-Müller-oven and molten for 2 to 3 hours at a temperature of 800-850° C. The platinum bowl is taken out of the oven and cooled to room temperature. The solidified melt is dissolved in distilled water and transferred into a beaker. Then concentrated hydrochloride acid is carefully added. After evolution of gas has ceased the water is evaporated such that a dry residue is obtained. The residue is dissolved in 20 ml of concentrated hydrochloric acid followed by evaporation of the liquid. The process of dissolving in concentrated hydrochloric acid and evaporation of the liquid is repeated once again. The residue is then moistened with 5 to 10 ml of aqueous hydrochloric acid (12%). About 100 ml of distilled water is added and the mixture is heated. To remove insoluble $SiO_2$, the sample is filtered and the residue remaining on the filter paper is thoroughly washed with hot hydrochloric acid (12%) and distilled water until no chlorine is detected in the filtrate.

b) Silicate Analysis

The $SiO_2$ is incinerated together with the filter paper and the residue is weighed.

c) Determination of Aluminum, Iron, Calcium and Magnesium

The filtrate is transferred into a calibrated flask and distilled water is added until the calibration mark. The amount of aluminum, iron, calcium and magnesium in the solution is determined by FAAS.

d) Determination of Potassium, Sodium and Lithium

A 500 mg sample is weighed in a platinum bowl with a precision of 0.1 mg. The sample is moistened with about 1 to 2 ml of distilled water and then four drops of concentrated sulphuric acid are added. About 10 to 20 ml of concentrated hydrofluoric acid is added and the liquid phase evaporated to dryness in a sand bath. This process is repeated three times. Finally $H_2SO_4$ is added to the dry residue and the mixture is evaporated to dryness on an oven plate. The platinum bowl is calcined and, after cooling to room temperature, 40 ml of distilled water and 5 ml hydrochloric acid (18%) is added to the residue and the mixture is heated to boiling. The solution is transferred into a calibrated 250 ml flask and water is added up to the calibration mark. The amount of sodium, potassium and lithium in the solution is determined by EAS.

Loss on Ignition

In a calcined and weighed platinum bowl about 0.1 g of a sample are deposited weighed in a precision of 0.1 mg. The platinum bowl is calcined for 2 hours at 1000° C. in an oven. Then the platinum bowl is transferred to an exsiccator and weighed.

Ion Exchange Capacity

The adsorbent/particles to be tested is/are dried at 150° C. for two hours. Then the dried material is allowed to react under reflux with a large excess of aqueous $NH_4Cl$ solution for 1 hour. After standing at room temperature for 16 hours, the material is filtered. The filter cake is washed, dried, and ground, and the $NH_4$ content in the adsorbent/particles is determined by the Kjedahl method. The amount and kind of the exchanged metal ions is determined by ICP-spectroscopy.

XRD

The XRD spectra are measured with a powder diffractometer X'-Pert-MPD (PW 3040) (Phillips), equipped with a Cu-anode.

Determination of the Sediment Volume:

A graduated 100 ml glass cylinder is filled with 100 ml of distilled water or with an aqueous solution of 1% sodium carbonate and 2% trisodium polyphosphate. 2 g of the compound to be analysed is placed on the water surface in portions of about 0.1 to 0.2 g with a spatula. After sinking down of a portion, the next portion of the compound is added. After adding 2 g of the compound to be analysed the cylinder is held at room temperature for one hour. Then the sediment volume (ml/2 g) is read from the graduation.

Determination of Montmorillonite Proportion by Methylene Blue Adsorption a) Preparation of a Tetrasodium Diphosphate Solution 5.41 g tetrasodium diphosphate are weighed with a precision of 0,001 g in a calibrated 1000 ml flask and the flask is filled up to the calibration mark with distilled water and shaken repeatedly.

b) Preparation of a 0.5% Methylene Blue Solution

In a 2000 ml beaker, 125 g methylene blue are dissolved in about 1500 ml distilled water. The solution is decanted and then distilled water is added up to a volume of 25 l. 0,5 g moist test bentonite having a known inner surface are weighed in an Erlenmeyer flask with a precision of 0,001 g. 50 ml tetrasodium diphosphate solution are added and the mixture is heated to boiling for 5 minutes. After cooling to room temperature, 10 ml $H_2SO_4$ (0.5 m) are added and 80 to 95% of the expected consumption of methylene blue solution is added. With a glass stick a drop of the suspension is transferred to a filter paper. A blue-black spot is formed surrounded by a colourless corona. Further methylene blue solution is added in portions of 1 ml and the drop test is repeated until the corona surrounding the blue-black spot shows a slightly blue colour, i.e. the added methylene blue is no longer adsorbed by the test bentonite.

c) Analysis of the Particles

The test of the particles is performed in the same way as described for the test of bentonite. On the basis of the spent methylene blue solution the inner surface of the particles is calculated.

According to this method 381 mg methylene blue/g particles correspond to a content of 100% montmorillonite.

Determination of Particle Size (Dry Sieve Residue)

Through a sieve cloth, a vacuum cleaner connected with the sieve aspirates over a suction slit circling under the perforated sieve bottom all particles being finer than the inserted sieve being covered on top with an acrylic glass cover and leaves the coarser particles on the sieve. The experimental procedure is as follows: Depending on the product, between 5 and 25 g of air dried material is weighed in and is put on the sieve.

Subsequently, the acrylic glass cover is put on the sieve and the machine is started. During air jet screening, the screening process can be facilitated by beating on the acrylic glass cover using the rubber hammer. Exhaustion time is between 1 and 5 minutes. The calculation of the dry screening residue in % is as follows: actual weight multiplied with 100 and divided by the initial weight.

Apparent Weight

A calibrated 1 l glass cylinder cut at the 1000 ml mark is weighed. By a powder funnel the sample is poured into the cylinder in a single step such that the cylinder is completely filled and a cone is formed on top of the cylinder. The cone is removed with help of a ruler and material adhering to the outside of the cylinder is removed. The filled cylinder is weighed again and the apparent weight is obtained by subtracting the weight of the empty cylinder.

X-Ray-Diffraction Analysis 1 to 2 g of sample were dry ground by hand in an agate mortar and then passed through a 20 μm sieve. This process was repeated until the entire sample passed the sieve. For the X-ray diffraction measurement a Siemens D5000 equipment was used. The following measuring conditions were employed:

| | |
|---|---|
| Sample holder | Plastic, "top loading", Ø = 25 mm |
| Thickness of the powder layer | 1 mm |
| X-ray tube | Cu Kα: 40 kV/40 mA |
| Diffraction angles | 2-80° (2 θ) |
| Measuring time | 3 sec per step |
| Slits | Primary and secondary divergence slits of 1 mm |

Qualitative evaluation of the diffractograms (assignment of the mineral phase was done with a computer program "EVA" by Bruker AXS GmbH, Karlsruhe and according to the publication of Brindley & Brown (1980): Crystal structures of clay minerals and their x-ray identification.—Mineralogical Society No. 5, 495.

The quantitative evaluation was made according to the Rietveld method using the computer program AutoQuan of the company Seifert (GE Inspection Technologies, Ahrensburg, Germany) based on the Rietveld method (see description) for the determination of the content of x-ray amorphous materials zincite as internal standard was added. For the correction the background a polynom of fourth order was used in the angle range of 4-80° in 2 θ.

Volatile compounds were determined using the EPA 24 (United States Environmental Protection Agency) method. In EPA Method 24 the percentage weight of volatile ingredients is determined by following ASTM D2369 the Standard Test Method for Volatile Content of Coatings.

Water and sediments were determined following the ASTM D 2709. Microorganisms, bacteria count were determined using the ASTM E 1259. Acid Number was determined using ASTM D 974a.

EXAMPLES

Example 1

General Characterization of Particles Comprised in the Adsorbents Used for Purification of Dry Cleaning Solvents

The properties of the particles comprised in the adsorbents used in the examples according to the invention are summarized in table 3. In the dry washing experiments of the examples, the adsorbents consisted only of the particles having an amorphous phase and a crystalline phase. However, it is possible to use suitable additives or minerals in addition to the particles as described herein. A skilled person knows suitable additives for use in the method of purification of dry cleaning solvents.

The particles with reference number "1" can be obtained under the trade name Tonsil® ULTRA from SUD CHEMIE DE MEXICO, S.A. de C.V. The particles with reference number "2" can be obtained from SUD CHEMIE DE MEXICO, S.A. de C.V. under the trade name Tonsil® PLUS F. The particles with reference number "3" can be obtained from SUD CHEMIE DE MEXICO, S.A. de C.V. under the trade name Tonsil® PLUS M.

TABLE 3 properties of particles used in the examples

| Particles | 1 | 2 | 3 | Tonsil® 414 FF |
|---|---|---|---|---|
| Dry sieve residue on 45 μm (%) | 49 | 100 | 100 | 32.7 |
| Dry sieve residue on 63 μm (%) | 35 | 99.8 | 99.3 | 22.9 |
| Particle size smaller than 0.25 mm, % | — | 33.0 | 5.2 | — |
| Particle size greater than 1.40 mm, % | — | 1.0 | 1.2 | — |
| apparent weight (g/l) | 292 | 618 | 623 | 580 |
| Methylene blue adsorption (mg/g sample) | 106 | 128 | 108 | 176 |
| Moisture content (%) | 8.0 | 3.0 | 2.3 | 10.0 |
| Ph (10 wt.-% in water) | 7.6 | 7.9 | 8.1 | 6.0 |
| cation exchange capacity (meq/100 g) | 52 | 44 | 53.3 | — |
| BET surface ($m^2/g$) | 208 | 180 | 140 | 224 |
| micropore area ($m^2/g$) | 32.1 | 21 | 16 | — |
| external surface ($m^2/g$) | 176.3 | 159 | 124 | 214 |
| micropore volume ($cm^3/g$) | 0.016 | 0.011 | 0.008 | — |
| cumulative pore volume (BJH) for pore diameter 1.7-300 nm ($cm^3/g$) | 0.825 | 0.379 | 0.297 | — |
| average pore diameter (BJH) (nm) | 16.4 | 10.3 | 10.3 | — |
| sediment volume (ml/2 g) | 5.5 | 3 | 4 | — |

In example 2, the commercially available surface modified bleaching earth Tonsil® 414 FF, obtainable from Sud-Chemie AG, Germany, has been used.

The chemical composition of the particles used in the examples is summarized in table 4.

TABLE 4

Chemical composition of particles/adsorbents

| Adsorbent | 1 | 2 | 3 | Tonsil® 414 FF |
|---|---|---|---|---|
| $SiO_2$ | 70.6 | 69.4 | 69.4 | 65.0 |
| $Fe_2O_3$ | 2.8 | 3.4 | 3.4 | 2.5 |
| $Al_2O_3$ | 9.8 | 9.9 | 9.9 | 13.0 |
| MgO | 4.1 | 3.1 | 3.1 | 1.5 |
| CaO | 1.4 | 2.5 | 2.5 | 5.7 |
| $K_2O$ | 1.5 | 1.3 | 1.3 | 1.1 |
| $Na_2O$ | 0.26 | 0.94 | 0.94 | 0.4 |
| $TiO_2$ | 0.25 | 0.38 | 0.38 | 1.18 |
| Loi (1000° C.) | 7.9 | 8.1 | 8.1 | 9.8 |

Characterization of Particles 1 and 2 by X-Ray Diffraction

X-ray diffraction measurements were made according to the general description for the method. The results are listed in table 5.

TABLE 5

Quantitative mineral phase determination by X-ray diffraction

| Mineral Phase | 1 | 2 |
|---|---|---|
| Smectite (wt.-%) | 40 | 40 |
| Illite/Muscovite (wt.-%) | Traces | n.d. |
| Kaolinite (wt.-%) | n.d. | 1 |
| Sepiolith (wt.-%) | 11 | n.d. |
| Quartz (wt.-%) | Traces | 1 |
| Orthoclase (wt.-%) | 12 | 8 |
| Plagioclase (different) (wt.-%) | 3 | 11 |
| Calcite (wt.-%) | Traces | 1 |
| Amorphous material (wt.-%) | 34 | 38 |

The results from quantitative X-ray diffraction analysis show the presence of smectitic phases in particles 1 and 2 as used in the method according to the invention. In addition various side minerals can be found, like sepiolith for particles 1, orthoclase, plagioclase (other feldspars), calcite. The X-ray diffraction shows the presence of more than 30% of amorphous material for both types of particles. The amorphous phase of the particles 2 is almost present in the same concentration as the smectite phase (ratio 100:95), whereas in particles 1 the ratio of smectite to amorphous material is 100:85. These analyses show that the particles used in the method according to the invention exhibit an entirely new structure compared to standard smectites. The presence of the high amount of amorphous material which can be assigned mostly as amorphous silica due to the high $SiO_2$ content in the silicate analysis explains also the high porosity of the particles used in the method of the invention.

Example 2

Comparison Between Tonsil®/DE Blend and an Adsorbent According to the Invention in Powder Form

The experiments with adsorbents in powder form were carried out in dry cleaning machines obtainable from the company Kelleher Equipment Supply Inc, USA, under the trade names "Force" and/or "Bergparma".

During the solvent purification process—which is performed typically when the solvent is too dark to avoid darkening of light color cloths—the nylon spin disc filter of the dry cleaning machine is precoated with the adsorbent/s. The nylon spin disc system is coated either with a Tonsil® 414 FF (1 pound)/DE (1 pound) blend (50:50) or the powder adsorbent Tonsil® ULTRA (1 pound) for a 35 pound capacity dry cleaning machine's equipped with spin disc filter. In this experiment Perc was used as the dry cleaning solvent.

A plastic bag is filled with powders and placed in the washing chamber. The machine was started as it is normally started for the washing cycle and solvent is brought into the washing chamber. The adsorbents got into contact with the dry cleaning solvent. Few minutes of rotation assures a good contact between the adsorbent and the dry cleaning solvent. Then the pump was started to empty the suspension adsorbent/dry cleaning solvent and pump it to the nylon spin disc filter, the solvent that passes through the filter is diverted over the washing chamber and returned back to the spin filter this recirculation process is continued for approximately ten minutes. This process coats the discs with Tonsil® 414 FF/diatomaceous earth and/or Tonsil® ULTRA, respectively. Allowing purifying the solvent with a recirculation process after this, the solvent is clean again and the machine is ready to clean clothes again.

At the end of purification of the solvent the filter is flooded with solvent in order to wash out the adsorbent layer and the discharged solvent was diverted to a compartment with mesh cloth where the adsorbent was separated and the solvent was drained by gravity during several hours before disposing of the solids and the solvent recovered could be added back to the machine.

For comparing the properties of a Tonsil® 414 FF/DE blend with the properties of a powder adsorbent according to the invention, the dry cleaning solvents after 12 cycles of washing, comprising each washing cycle washes 35 lb of clothes and uses the same solvent over and over at a rate of one gallon of solvent/lb of cloth, meaning 35 gallon reused 12 times in a 35 lb machine, were compared to each other.

The experiment showed that the dry cleaning solvent was cleaner when using one pound of the powder adsorbent according to the invention compared to the use of two pounds of the Tonsil® 414 FF/DE mixture. Furthermore, the pressure drop in the solvent pump during operational condition was lower for the powder adsorbent according to the invention, which indicates better filtration properties.

The results showed that no DE is required when using the powder adsorbent according to the invention. Furthermore, it was shown that the cleaning capacity of the powder according to the invention is higher than the cleaning capacity of the Tonsil® 414 FF/DE mixture. The filtration properties of the powder adsorbent according to the invention were very good with respect to all types of clothes.

Example 3

In the examples with adsorbents in granular form, the dry cleaning machines obtainable from Kelleher Equipment Supply Inc, USA, under the trade names "Force" and/or "Bergparma", were used.

The experiment was carried out using a steel canister filter; this filter was filled with granular adsorbent/s according to the invention. The filter has a porous paper wall or a perforated steel wall to avoid fine particles leaching out of the canister. The particle size of the adsorbent varied from the range 75 microns to 1,000 microns, the adsorbent had at least 90% of the particles into this range. For comparison reasons the use of the granular adsorbent according to the invention was compared to a traditional distillation system.

In order to analyze the efficiency in purification during the washing process, baseline solvent sample was collected at the beginning of the trial; fresh and clean solvent was analyzed and used as reference for future results using granular adsorbent to purify solvents.

During the washing process, the dry cleaning solvent was occasionally diverted through the cartridges until the solvent got to an acceptable level in clarity which could be judged when the solvent passed through a glass window in the recovery system, this operation can be manually performed when to the opinion of the operator the solvent contains visible dyes or looses clarity. Solvent samples were collected at different intervals of operation typically measured in pounds of clothes cleaned starting since the machine was fed with fresh and clean solvent, and using a fresh filter cartridge with granular adsorbent this is an accumulative value that reflects the number of accumulative pounds that could be cleaned by a cartridge before the cartridge losses its power or is saturated with impurities.

All solvent samples were analyzed for water content, non volatile residue, bacteria content, and fatty acid content. Upon reintroduction of a new granular adsorbent cartridge, the solvent is circulated through the cartridges and clarified. Another solvent sample is taken to measure reduction of impurities upon replenishing the granular adsorbent powder.

The results of the analysis of the dry cleaning solvent during the washing process are summarized in table 6 below. Table 6 shows that the use of the granular adsorbent according to the invention could be more effective than the use of a distillation unit in the machine, eliminating energy paid in utilities either in the heater and cooling devices, vapor emissions and possibly the necessity of the whole distillation unit in the machine therefore conducting to potential savings by avoiding those costs.

TABLE 6

Analysis of the dry cleaning solvents during the washing process

| Description | Non Volatil Matter (%) | Water and Sediment (%) | Bacteria Count/ml | Fatty Acid as Total acid number mg KOH/gr |
|---|---|---|---|---|
| Solvent DF 2000 brand new | 4.60 | <0.05 | Nil | 0.01 |
| Solvent DF 2000 after 1,010# | 0.38 | <0.05 | Nil | 0.06 |
| Solvent DF 2000 after 2,400# | 1.58 | <0.05 | Nil | 0.20 |
| Solvent DF 2000 after 6,500# | 1.10 | <0.05 | Nil | 0.22 |
| Solvent DF 2000 after 10,900# | 3.08 | <0.05 | Nil | 0.22 |
| Solvent Activated Clay KR Filtration | 0.93 | <0.05 | Nil | 0.06 |
| Solvent after Granular Material Circulation | 0.35 | <0.05 | Nil | 0.13 |
| Tonsil ®/Carbon Split | 1.28 | <0.05 | Nil | 0.22 |

The invention claimed is:

1. A method for the purification of dry cleaning solvents, comprising use of an adsorbent comprising particles comprising an amorphous silica phase and a smectite phase, wherein the ratio of smectite phase/amorphous phase is within a range of 2 to 0.5.

2. A method according to claim 1, wherein the smectite phase represents a montmorillonite phase.

3. A method according to claim 1, wherein the adsorbent is used in the form of powders, agglomerates or granules.

4. A method according to claim 1, wherein the adsorbent is used as a powder with a particle size between 1 and 1000 µm, or as agglomerates or granules with a particle size between 0.01 and 10 mm.

5. A method according to claim 1, wherein the adsorbent is used in a suspended state or in an immobilized state.

6. A method according to claim 1, wherein the dry cleaning solvents are selected from the group consisting of perchloroethylene (PERC), hydrocarbons, silicones, and mixtures thereof.

7. A method according to claim 1, wherein the purification of the dry cleaning solvents comprises removing of impurities selected from the group consisting of non-volatile residues, lint, dyes, grease, soils, soaps, and traces of detergents.

8. Filter unit containing an adsorbent as defined in claim 1.

9. Filter unit according to claim 8, wherein the filter unit is a filter cartridge, of a carbon tower filter.

10. Dry cleaner containing a filter unit as defined in claim 8.

11. Process for dry cleaning textiles, wherein the textiles are washed using at least one dry cleaning solvent, and wherein the dry cleaning solvent/s is/are purified using at least the adsorbent as defined in claim 1.

12. Process according to claim 11, wherein the adsorbent is suspended in the dry cleaning solvent/s during the purification of the dry cleaning solvent/s, and wherein the adsorbent is separated from the dry cleaning solvent/s using a filter, in particular a nylon disc filter or a filter cartridge.

13. A process for dry cleaning textiles, wherein the textiles are washed using at least one dry cleaning solvent, and wherein the dry cleaning solvent/s is/are purified using a filter unit according to claims 8.

* * * * *